Nov. 18, 1969 G. R. GAULD 3,479,531

RELAY COMPRISING COMPLEMENTARY SYMMETRY-CONNECTED TRANSISTORS WITH ISOLATED INDUCTANCE-RECTIFIER INPUT NETWORKS

Filed Oct. 7, 1966

INVENTOR.
GODFREY R. GAULD
BY Alden D. Redfield
Charles M. Hogan
ATTORNEYS.

United States Patent Office 3,479,531

Patented Nov. 18, 1969

3,479,531

RELAY COMPRISING COMPLEMENTARY SYMMETRY-CONNECTED TRANSISTORS WITH ISOLATED INDUCTANCE-RECTIFIER INPUT NETWORKS

Godfrey R. Gauld, Richmond, Ind., assignor to Avco Corporation, Richmond, Ind., a corporation of Delaware Filed Oct. 7, 1966, Ser. No. 585,001
Int. Cl. H03k *17/00*
U.S. Cl. 307—255 4 Claims

ABSTRACT OF THE DISCLOSURE

This is an electronic relay comprising a pair of transistors connected in complementary symmetry and having their emitters connected to a common central teminal. One of the transistors is normally non-conductive so as effectively to disconnect the central terminal from one of the end terminals. The other transistor is normally conductive so as effectively to connect the central terminal to the other end terminal. The driving means comprising a blocked oscillator with a transformer output is coupled to inductance-rectifier networks feeding said tansistors. One of these networks comprises a first transformer output winding connected in series with a first rectifier, between the base and emitter of the first transistor. The other network comprises a second transformer output winding connected in series with a second rectifier between the base and collector of the other transistor. Responsive to an output pulse developed by the blocking oscillator, the first transistor is rendered conductive effectively to connect the central terminal to the first-mentioned end terminal and the second transistor is rendered non-conductive.

The present invention relates to relays and its principal object is to provide an all electronic relay in which the contacts are isolated, that is, a non-mechanical means for the opening and closing of electrical circuits which are isolated from each other and from the controlling circuit.

For a better understanding of the invention, together with further objects, advantages, and capabilities thereof, reference is made to the following description of the accompanying drawings in which.

Figure 1:
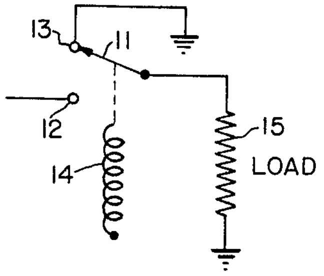
FIG. 1 is a mechanical analog to the relay provided in accordance with the invention.

The present invention is the electric analog of an electromechanical relay device. For example, let there be considered a relay device (FIG. 1) which functions to close a movable contact 11 onto contact 12 of a pair of fixed contacts 12 and 13. The action of this relay is such that the movable arm 11 is normally in contact with a grounded contact 13. However, when solenoid 14 is enegized then the movable contact 11 is moved out of contact with contact 13 and into contact with contact 12. The element 15, connected between contact 11 and ground, repesents the load. Now by analogy the terminal marked 12' in FIG. 2 corresponds to the contact 12. The terminal marked 11' corresponds to the movable contact 11 and the grounded terminal marked 13' corresponds to the contact 13. While in FIG. 1 the coil 14 causes the contact 11 mechanically to be displaced, in the FIG. 2 circuit in accordance with the invention there are no moving contacts and the operation is such that the contact 11' is shifted in potential. Thus it will be seen that the preferred embodiment of the invention corresponds to or is an electronic analog of an electromechanical relay.

Figure 3:
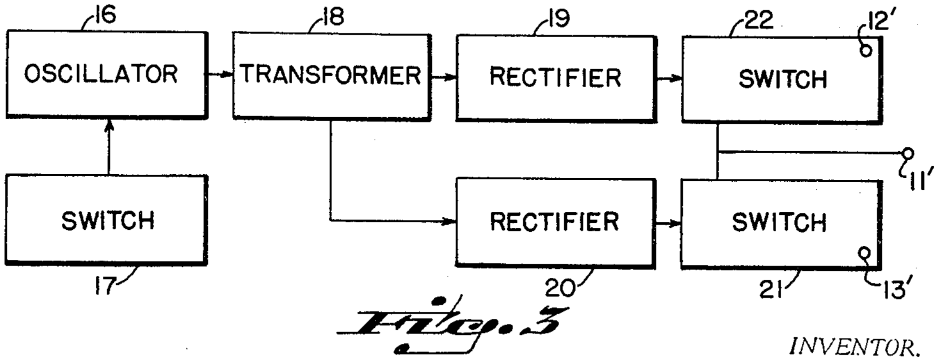
FIG. 3 is a block diagram showing of the FIG. 2 embodiment.

Referring now to FIG. 3, the principal elements of the invention are: first, an oscillator 16 which generates alternating currents when it is turned on by a switch 17; second, a transformer 18 which supplies oscillations from the transformer circuit to the rectifier circuits in cascade therewith; third, rectifier circuits 19 and 20, which provide control currents and voltages; fourth, an electronic switch 21 for the circuit which is to be opened (i.e., the circuit 11' and 13') and an electronic switch 22 for the circuit which is to be closed (i.e., 11' and 12'). The oscillator 16 generates an alternating current signal which is applied to the transformer 18. The transformer 18 isolates the switch circuits from each other and provides the proper voltage to operate the switches 21 and 22. The rectifying and switching circuits are so arranged that the controlling currents cannot flow in the circuits which are being switched.

Figure 2:
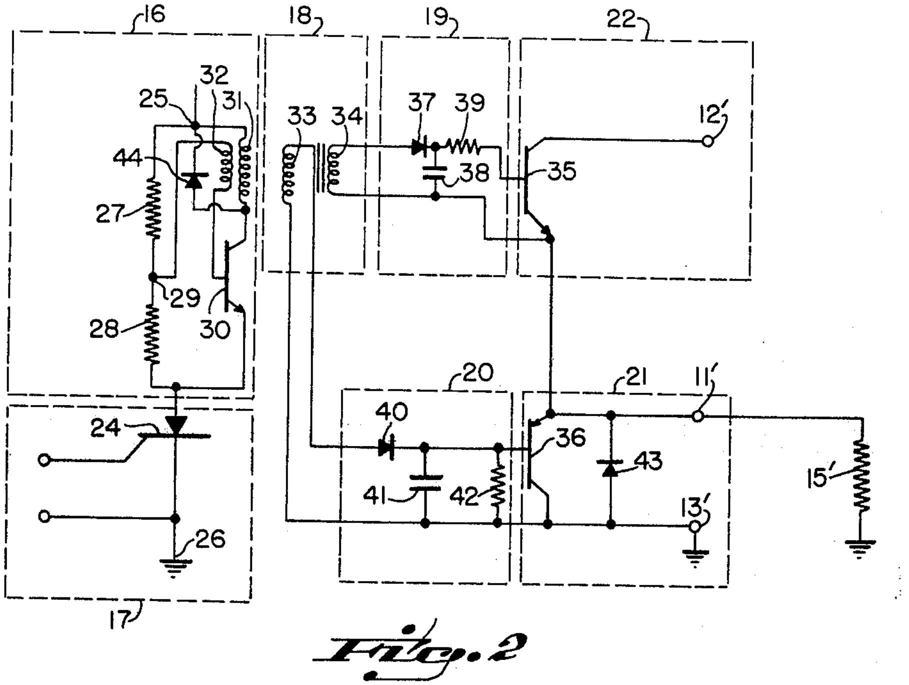
FIG. 2 is a circuit schematic of a complete electronic relay in accordance with the invention.

The relay action is initiated by a positive pulse or voltage level appled to a silicon control rectifier 24 (FIG. 2). This completes a circuit between the positive terminal 25 and ground 26, via resistors 27 and 28 so that a voltage is applied to NPN transistor 30. This transistor functions as a blocking oscillator, secondary winding 31 in its collector circuit being coupled to primary winding 32 in its base circuit whereby the oscillator 16 generates alternating currents. Oscillator 16 is a conventional free-running, blocking oscillator, with inductive feedback provided by a winding 31 between collector and bias source supply terminal 25 and winding 32 between base and tap 29 of resistor chain 27–28. In addition to the windings 31 and 32 the transformer 18 further has tertiary windings 33 and 34 in which induced alternating currents appear. Now the over-all operation is such that the collector emitter circuit of NPN-type transistor 35 is made to "look like" a low resistance or short circuit as far as the terminals 11' and 12' are concerned, while the emitter collector circuit of PNP-type transistor 36 is made to look like a high resistance or open circuit as far as contacts 11' and 13' are concerned. The conditions for accomplishing these results are the application of a positive voltage to the base of transistor 35, thereby forward biasing that transistor and the application of a positive voltage to the base of transistor 36, thereby biasing it in a reverse manner. Accordingly, the rectifier circuit 19 is inserted between secondary 34 and the base-emitter circuit of transistor 35. This rectifying circuit comprises a series diode 37, a shunt capacitor 38 and a series resistor 39, the resistor being connected to the base of transistor 35 and one terminal of capacitor 38 being connected to the emitter of transistor 35.

In order to drive transistor 36 into non-conductivity there is inserted between tertiary winding 33 and the base-collector circuit of transistor 36 the rectifying network 20, comprising series diode 40, shunt capacitor 41, and shunt resistor 42, the shunt elements being connected directly across the base-collector circuit of transistor 36. Transistors 35 and 36 are connected in complementary symmetry, the emitters being connected together.

It will be understood that a load 15', such as a detonator in ordnance, is connected between terminal 11' and ground (i.e., terminal 13'). Terminal 12' is connected to a source of firing pulses (not shown). In operation, a positive pulse is applied to the silicon control rectifier 24, whereupon oscillator 16 generates oscillations and the rectifying circuits 19 and 20 produce rectified and filtered outputs. The rectified output of network 19 drives NPN transistor 35 into conductivity. The rectified output of rectifier 20 drives PNP transistor 36 into non-conductivity. The voltage across capacitor 41 raises the potential of the base of transistor 36 so that the voltage of the emitter of transistor 36 must be higher than the voltage across capacitor 41 in order to permit emitter current flow. Therefore, the emitter-collector circuit of transistor 36 is substantially open.

The impedance of the circuit path through transistor 36 in the closed circuit condition is several hundred ohms for direct currents, but it is substantially zero for short pulses. The closed circuit condition (that is, the condition which exists before the oscillator is turned on) is maintained as follows: A voltage appearing at the emitter of transistor 36, in the absence of a voltage across capacitor 41, causes a current flow through the emitter base junction into the load network 41, 42. This current flow will provide carriers to establish a current path from the emitter to the collector of transistor 36. For short pulses most of the base current will flow through capacitor 41, with the result that an effective capacitance equal to the gain of the transistor 36 multiplied by the capacitance of element 41 will apear across the normally closed contacts 11′, 13′. This is a large capacitance and is substantially a short circuit for a pulse. When a voltage persists across the normally closed contacts 11′, 13′ until equilibrium is reached, the base current will be carried by resistance 42, resulting in an effective contact resistance equal to the resistance of the element 42 divided by the transistor gain. This particular configuration was used in order to provide for contact closure between 11′ and 13′ (FIG. 2) even when the supply of power is removed, so that the firing circuit to load 15′ will be short-circuited until the silicon control rectifier 24 is fired.

When transistor 35 is conductive, this effectively provides a short circuit between 11′ and 12′. When transistor 36 is non-conductive, this effectively provides an open circuit between the contacts 11′ and 13′.

The diode 44 is a conventional clipper in the blocking oscillator and it is connected across winding 31. The diode 43, connected between emitter and collector of transistor 36, provides a short for negative-going pulses as applied to the emitter of transistor 36.

While there has been disclosed and described what is considered to be the preferred embodiment of the invention, it will be understood by those skilled in the art that vaious modifications and changes may be made therein without departing from the scope of the invention as defined in the appended claims.

I claim:

1. An electronic relay comprising:
a first transistor including a first emitter and a first base and a first collector,
a second transistor including a second emitter and a second base and a second collector,
said transistors being connected in complementary symmetry to provide end terminals, said first and second emitters being connected together to provide a common central terminal,
driving means comprising a blocking oscillator having an output transformer, said transformer including first and second output windings,
a first rectifier, constituting with the first one of said windings, a rectifier network coupled to the first transistor, and
a second rectifier, constituting with the second one of said windings, a rectifier network coupled to the second network.

2. An electronic relay in accordance with claim 1 in which the second rectifier network comprises a resistance-capacitance time constant circuit connected between the base and collector of the second transistor in such manner as to assure short circuiting of the central terminal to the other of said terminals in the absence of operation of said oscillator.

3. An electronic relay in accordance with claim 2 and means for starting said oscillator.

4. An electronic relay comprising:
a first switching transistor and a second switching transistor connected to provide end terminals and a common central terminal;
the first switching transistor having a first emitter and a first base and a first collector, the second transistor having a second emitter and a second base and a second collector;
means including a first rectifier for driving the first transistor into conductivity;
means including a second rectifier for driving the other transistor into non-conductivity, thereby short-circuiting the central terminal to one of said end terminals and open-circuiting the other end terminal from said common central terminal; and
means including a transformer having windings individually coupled to said rectifiers for energizing said rectifiers,
one of said windings being connected in series with the first rectifier between the first base and emitter, and the other of said rectifiers being connected with the other of said windings between the second base and the second collector.

References Cited

UNITED STATES PATENTS

| | | | |
|---|---|---|---|
| 2,976,527 | 3/1961 | Smith | 307—255 X |
| 3,165,642 | 1/1965 | Noll | 307—255 X |
| 3,284,637 | 11/1966 | Berry | 307—254 X |

DONALD D. FORRER, Primary Examiner

U.S. Cl. X.R.

307—252, 255, 275, 313; 331—112